US006376570B1

(12) United States Patent
Zhao et al.

(10) Patent No.: US 6,376,570 B1
(45) Date of Patent: Apr. 23, 2002

(54) AQUEOUS PIGMENTED COATING COMPOSITIONS

(75) Inventors: Cheng-Le Zhao, Charlotte, NC (US); Uwe Dittrich, Ludwigshafen (DE); Manfred Schwartz, Frankenthal (DE); Gernot Franzmann, Bobenheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/552,731

(22) Filed: Apr. 19, 2000

(30) Foreign Application Priority Data

Apr. 21, 1999 (DE) .......................................... 199 18 052

(51) Int. Cl.⁷ .......................... C08J 3/28; C09D 133/14; C08K 3/00
(52) U.S. Cl. .............................. 522/42; 522/81; 522/83; 522/84; 522/86; 524/845
(58) Field of Search ............................... 522/84, 85, 86, 522/81, 83, 42; 524/845

(56) References Cited

U.S. PATENT DOCUMENTS

| 3,320,198 A | 5/1967 | Hill et al. |
|---|---|---|
| 4,999,218 A | 3/1991 | Rehmer et al. |
| 5,439,970 A | 8/1995 | Reeb |
| 5,441,775 A | 8/1995 | Beck et al. |
| 5,530,056 A | 6/1996 | Farwaha et al. |
| 5,576,384 A | 11/1996 | Nölken et al. |
| 5,610,225 A | 3/1997 | Farwaha et al. |
| 5,618,876 A | 4/1997 | Farwaha et al. |
| 5,708,077 A | 1/1998 | Nölken et al. |
| 5,905,114 A | 5/1999 | Baumstark et al. |

FOREIGN PATENT DOCUMENTS

| BE | 642 869 | 7/1964 |
|---|---|---|
| DE | 3827975 A1 | 3/1990 |
| DE | 40 03 909 A1 | 8/1991 |
| DE | 43 18 083 A1 | 5/1994 |
| DE | 196 21 574 A1 | 12/1997 |
| EP | 0 010 000 A1 | 4/1980 |
| EP | 0 327 006 A2 | 8/1989 |
| EP | 0 355 028 | 5/1992 |
| EP | 0 599 676 A1 | 6/1994 |
| EP | 0 609 756 A2 | 8/1994 |
| EP | 0 612 805 B1 | 8/1994 |
| EP | 0 624 610 A2 | 11/1994 |

OTHER PUBLICATIONS

W. Arthur Green, *Water Soluble Photoinitiators—A Review* EuroCoat, May, 1994; pp. 274; 276; 278; 280; 282; 284; 286; 288; 291.

*Primary Examiner*—Susan W. Berman
(74) *Attorney, Agent, or Firm*—Oblon, Spivak, McClelland, Maier & Neustadt, P.C.

(57) ABSTRACT

The present invention provides aqueous pigmented coating compositions having a pigment volume concentration pvc of at least 10 which are essentially free from volatile organic compounds and comprise:

(i) at least one aqueous room temperature film forming polymer dispersion of at least one polymer P which is composed of esters of acrylic acid with $C_2$–$C_{20}$ alkanols or $C_5$–$C_{10}$ cycloalkanols and/or esters of methacrylic acid with $C_1$–$C_{20}$ alkanols or $C_5$–$C_{10}$ cycloalkanols, (ii) at least one inorganic pigment and, if desired, organic or inorganic fillers, (iii) from 0.05 to <0.3% by weight, based on the polymer P, of at least one nonpolymerizable photoinitiator, (iv) water, and customary auxiliaries.

8 Claims, No Drawings

AQUEOUS PIGMENTED COATING COMPOSITIONS

The present invention relates to aqueous, essentially solvent-free, pigmented coating compositions which comprise at least one dispersion of a film-forming polymer P.

Pigmented aqueous coating compositions generally include a film-forming polymer in the form of an aqueous polymer dispersion as a binder for the pigment particles and any fillers that may be present. When the coating dries, the polymer particles present in the polymer dispersion form a polymer film which binds the pigment particles and the fillers. The development of a uniform polymer film is only ensured when the coating composition is processed at temperatures above the minimum film-forming temperature (MFT; the temperature above which the polymer in the coating composition forms a polymer film). A low minimum film-forming temperature can be obtained in principle by using a polymeric binder having a low glass transition temperature. Polymeric binders having a low glass transition temperature, however, have the disadvantage that the polymer film is soft and tacky. This has the consequence, in turn, of low blocking resistance and a high soiling tendency of the coating. Conventional coating compositions therefore generally include a polymer having a relatively high glass transition temperature and a film-forming auxiliary which lowers the film formation temperature of the polymer. The film-forming auxiliaries (coalescants) are generally volatile organic compounds, such as solvents or plasticizers, which initially facilitate film formation when the coating is drying. On further drying, the film-forming auxiliaries are emitted to the ambient atmosphere, as a result of which the surface hardness of the polymer film is increased and its tackiness is reduced. The emission of such volatile substances to the ambient atmosphere, however, represents a severe environmental burden. It is therefore desirable to avoid film-forming auxiliaries and other volatile constituent in pigmented aqueous coating compositions.

U.S. Pat. Nos. 5,530,056 and 5,610,225 disclose binders for solvent-free aqueous coating compositions which comprise in copolymerized form special esters of acrylic acid or methacrylic acid with polyethylene glycols (PEG monomers). PEG monomers are comparatively expensive and their effect is not always satisfactory.

EP-A-327 006 describes aqueous addition-polymer dispersions which comprise small amounts of silane monomers in copolymerized form. Polymer dispersions of this kind are likewise suitable as binders for low-solvent coating compositions. Even a low level of incorporation of silane monomers, however, increases considerably the costs of preparing the binder polymers.

EP-A-609 756 and EP-612 805 disclose binders for solvent-free emulsion paints which comprise as binder polymers multistage addition polymers comprising a hard polymer and a soft polymer.

DE 196 21 574 describes the use of copolymers of vinylaromatic monomers with alkyl acrylates as binders in coating compositions containing pigments or fillers. coatings based on the binders described therein have high wet abrasion resistance especially when the binder polymer contains less than 1% by weight of acidic monomers in copolymerized form. The resultant coatings possess only average weathering stability, especially on prolonged exposure to UV radiation.

U.S. Pat. No. 3,320,198 discloses that the soiling tendency of coatings comprising a polyacrylate as polymeric binder can be reduced by adding benzophenone in an amount of more than 0.3% by weight, preferably from 0.5 to 3% by weight, based on the polymeric binder. The emulsion paints it describes, however, contain relatively large amounts of organic solvents. DE 38 27 975 likewise discloses coating compositions containing photoinitiators. The examples, however, describe only pigment-free coating compositions of at least 0.4% by weight of photoinitiator, based on the polymeric binder.

EP-A-599 676 describes latex paint binders comprising aqueous polymer dispersions which comprise polymerizable derivatives of benzophenone in copolymerized form. The use of special monomers of this kind likewise increases the costs of the binder to a considerable extent.

It is an object of the present invention to provide aqueous pigmented coating compositions which result in coatings having good wet abrasion resistance and a low soiling tendency and being essentially free from volatile organic compounds such as plasticizers and solvents. The binder polymer should be preparable without complex preparation processes and without the use of costly, special monomers. The coatings, furthermore, should be particularly stable with respect to exposure to UV radiation, i.e., on prolonged weathering.

We have found that this object is achieved and that pigmented coating compositions which are essentially free from volatile organic compounds and whose binder polymer is composed essentially of esters of acrylic acid and/or of methacrylic acid lead to coatings having a low soiling tendency and good weathering stability if the coating composition includes a small amount, but less than 0.3% by weight, based on the polymer, of a nonpolymerizable photoinitiator.

The present invention accordingly provides aqueous pigmented coating compositions having a pigment volume concentration of at least 10 which are essentially free from volatile organic compounds and comprise:

(i) at least one aqueous room temperature film forming polymer dispersion of at least one polymer P which is composed of from 80 to 99.95% by weight of at least one monomer A selected from the esters of acrylic acid with $C_2$–$C_{20}$ alkanols or $C_5$–$C_{10}$ cycloalkanols and the esters of methacrylic acid with $C_1$–$C_{20}$ alkanols or $C_5$–$C_{10}$ cycloalkanols, from 0.05 to 10% by weight of at least one monomer B selected from ethylenically unsaturated carboxylic acids, ethylenically unsaturated sulfonic acids, ethylenically unsaturated phosphonic acids and their salts, and from 0 to 20% by weight of one or more monomers C which are different than the monomers A and A, (ii) at least one inorganic pigment and, if desired, organic or inorganic fillers, (iii) from 0.05 to <0.3% by weight, based on the polymer P, of at least one nonpolymerizable photoinitiator, (iv) water, and customary auxiliaries.

The coating compositions of the invention generally contain less than 0.5%, preferably less than 0.1%, in particular less than 500 ppm and, especially, less than 300 ppm of volatile organic compounds. These include organic solvents, plasticizers (organic liquids having a boiling point above 250° C.) and—deriving from their preparation—unpolymerized monomers (known as residual monomers). The volatile organic compounds present in the coating compositions of the invention preferably do not include additions such as solvents or plasticizers but exclusively contain volatile organic impurities deriving from their preparation, such as residual monomers and conversion products thereof. The residual monomer content of the coating compositions of the invention is advantageously below 300 ppm and in particular below 200 ppm.

The pigment volume concentration (pvc) is defined as 100 times the quotient of the total volume of fillers and pigments present in the coating composition divided by the total volume of fillers, pigments and binder polymer, in this case polymer P.

In order to be assured of uniform film formation without the addition of film-forming auxiliaries it is necessary for the minimum film-forming temperature (MFT) of the dispersion of the polymer P to be below its processing temperature. The difference between processing temperature and minimum film-forming temperature is preferably at least 5 K and in particular at least 10 K. The minimum film-forming temperature of the aqueous dispersion of the polymer P will be preferably below 10° C. and in particular below 5° C. The minimum film-forming temperatures considered are the values determined in accordance with DIN 53787 (see Ullmanns Enzyklopädie der Technischen Chemie, 4th Ed. Vol. 19, VCH Weinheim 1980, p. 17). In accordance with the invention, the MFT is established by choosing a polymer P having a suitable glass transition temperature $T_g$. The MFT of an aqueous dispersion of a polymer is generally up to 15 K below its glass transition temperature $T_g$. Accordingly, the glass transition temperature of the polymer P is chosen preferably below 25° C. and in particular below 15° C. Where increased processing temperatures are possible, such as in regions having a high ambient temperature, for example, the polymer P can of course also have a higher glass transition temperature, of up to 30° C., for example. The glass transition temperature $T_g$ will not exceed a value of preferably −25° C. and in particular −10° C., so as to ensure sufficient hardness and strength of the polymer film.

In this application the term glass transition temperature means the glass transition temperature (cf. ASTM D 3418-82) determined by the DSC method (Differential Scanning Calorimetry, 20° C./min, midpoint).

In order to establish the desired $T_g$, the skilled worker preparing the polymer P will start from a suitable monomer mixture. According to Fox (T. G. Fox, Bull. Am. Phys. Soc. (Ser. II) 1, [1956] 123 and Ullmanns Enzyklopädie der technischen Chemie, 4th Edition, Volume 19, Verlag Chemie, Weinheim (1980), p. 17, 18) the glass transition temperature of copolymers at high molecular masses is given in good approximation by $$\frac{1}{T_g} = \frac{X^1}{T_g^1} + \frac{X^2}{T_g^2} + \ldots \frac{X^n}{T_g^n}$$

where $X^1, X^2, \ldots, X^n$ are the mass fractions of the monomers $1, 2, \ldots, n$ and $T_g^1, T_g^2, \ldots, T_g^n$ are the glass transition temperatures of the homopolymers of each of the monomers $1, 2, \ldots, n$, in degrees Kelvin. Sources of tabulated glass transition temperatures of homopolymers are, for example, Ullmann's Encyclopedia of Industrial Chemistry, 5th ed., VCH, Weinheim, Vol. A 21 (1992) p. 169, and J. Brandrup, E. H. Immergut, Polymer Handbook 2nd ed, J. Wiley, New York 1975, pp. 139–192.

The nonpolymerizable photoinitiators of the invention are generally compounds which bring about a crosslinking reaction of the polymers P by exposure to sunlight. .Examples of suitable compounds are those having a diaryl ketone structure, such as benzophenone, thioxanthone and derivatives thereof. In these compounds, one or both phenyl rings may be substituted one or more times. Suitable substituents are $C_1$–$C_4$ alkyl, e.g., methyl, hydroxyl, $C_1$–$C_4$ alkyloxy, hydroxy-$C_1$–$C_4$ alkyl, hydroxy-$C_1$–$C_4$ alkyloxy, amino, $C_1$–$C_4$ alkylamino, nitro, carboxyl, carboxy-$C_1$–$C_4$ alkyl, e.g., carboxymethyl, acyloxy such as acryloyloxy and methacryloyloxy, and nitro. Also suitable are substituents which give the photoinitiator increased solubility in water. Substituents of this kind have neutral or ionic groups such as trialkylammonium groups, e.g., triethylammonium and trimethylammonium groups, sulfonate groups, carboxylate groups, or polyalkylene oxide groups. Examples of such substituents are: trimethylammonium methyl, trimethylammonium propyloxy, 2-hydroxy-3-trimethylammonium (each as the chloride), sulfomethyl, 3-sulfopropyloxy (each as the sodium salt), and HO–$(C_2H_4$—O$)_n$—, where n is from 2 to 100. Benzophenone and its derivatives are preferred in accordance with the invention. Particular preference is given to benzophenone derivatives in which only one of the phenyl rings carries substituents, especially to those which have only one substituent, and specifically to those in which this substituent is located in position 4 of the phenyl ring. Examples of particularly suitable benzophenone derivatives are 4-methylbenzophenone, 4-hydroxybenzophenone, 4-aminobenzophenone, 4-chlorobenzophenone, 4-carboxybenzophenone, 4,4'-dimethylbenzophenone, 4,4'-dichlorobenzophenone, 4-carboxymethylbenzophenone, 3-nitrobenzophenone, and 2,4,6-trimethylbenzophenone. Examples of suitable benzophenone derivatives having increased solubility in water are benzophenone 4-methanesulfonate, 3-(4-benzoylphenoxy) propanesulfonate, in each case as the sodium salt, 4-benzoylbenzyltrimethylammonium chloride (=4-(trimethylammonium-methyl)benzophenone as the chloride) and 2-hydroxy-3-(4-benzoylphenoxy)propane-1-trimethylammonium chloride. With particular preference, benzophenone is used as the nonpolymerizable photoinitiator of the invention, with performance advantages likewise being possessed by room temperature liquid mixtures of benzophenone and suitable auxiliary substances. Examples of liquid mixtures of this kind are 2,4,6-trimethylbenzophenone/benzophenone in a molar ratio of from 1.3:1 to 1:1 or 1-hydroxycyclohexyl phenyl ketone/benzophenone in a molar ratio, for example, of 1:1. Mixtures of this kind are described inter alia in EP-A-209 831, which to that extent is hereby incorporated by reference. In accordance with the invention, the photoinitiators are used in the coating composition in an amount of less than 0.3% by weight, based on the polymer P. The amount of photoinitiator used is preferably more than 0.05% by weight and, in particular, more than 0.1% by weight. It is preferably up to 0.25% by weight, based on the polymer P. In particular, amounts of from about 0.1 to 0.25% by weight, based on polymer P, of benzophenone, alone or as a blend with 1-hydroxy-1-benzoylcyclohexane, have proven suitable.

The polymer P used as binder in accordance with the invention is composed essentially, i.e., to the extent of at least 80% by weight, based on the overall weight of the polymer P, of esters of acrylic acid and/or esters of methacrylic acid with $C_1$–$C_{20}$, preferably $C_1$–$C_{12}$ and, in particular, $C_1$–$C_8$ alkanols or $C_5$–$C_{10}$ cycloalkanols (monomers A). Examples of suitable $C_1$–$C_{20}$ alkanols are methanol, ethanol, n-propanol, isopropanol, 1-butanol, 2-butanol, isobutanol, tert-butanol, n-hexanol, 2-ethylhexanol, lauryl alcohol, and stearyl alcohol. Examples of suitable cycloalkanols are cyclopentanol, cyclohexanol, 4-tert-butylcyclohexan-1-ol, 3,3,5-trimethylcyclohexan-1-ol, and isoborneol. Preferred monomers A are $C_1$–$C_4$ alkyl methacrylates such as methyl methacrylate, n-butyl methacrylate, isobutyl methacrylate, and tert-butyl methacrylate, and also $C_2$–$C_{10}$ alkyl acrylates such as ethyl acrylate, n-butyl acrylate, tert-butyl acrylate, n-hexyl acrylate, n-octyl acrylate, 2-ethylhexyl acrylate, decyl acrylate, and 2-propylheptyl acrylate.

It has proven advantageous in accordance with the invention for the monomers A to comprise, based on their overall weight, from 25 to 55% by weight of at least one ester of methacrylic acid with a $C_1$–$C_4$ alkanol, especially methyl methacrylate, and from 45 to 75% by weight of at least one ester of acrylic acid with a $C_2$–$C_{10}$ alkanol, especially n-butyl acrylate, 2-ethylhexyl acrylate or mixtures thereof.

The polymers P used in the coating compositions of the invention further include from 0.05 to 10% by weight, preferably from 0.1 to 5% by weight and, in particular, from 0.2 to 3% by weight, based on the overall amount of polymer P, of at least one monomer B selected from ethylenically unsaturated carboxylic acids, ethylenically unsaturated sulfonic acids, ethylenically unsaturated phosphonic acids and salts thereof, especially their sodium, potassium and ammonium salts. Examples of ethylenically unsaturated carboxylic acids are monoethylenically unsaturated $C_3$–$C_8$ monocarboxylic acids such as acrylic acid, methacrylic acid, crotonic acid, vinylacetic acid, acrylamidoglycolic acid, and methacrylamidoglycolic acid, and also monoethylenically unsaturated $C_4$–$C_8$ dicarboxylic acids such as maleic acid, fumaric acid, itaconic acid, and citraconic acid, and also the monoesters thereof with $C_1$–$C_{10}$ alkanols, such as monomethyl maleate and mono-n-butyl maleate. Examples of ethylenically unsaturated sulfonic acids are vinylsulfonic acid, 2-acrylamido-2-methylpropanesulfonic acid, 2-acryloxyethanesulfonic acid, 3-acryloxypropanesulfonic acid, and vinylbenzenesulfonic acid. Examples of suitable phosphonic acids are vinylphosphonic acid, allylphosphonic acid and 2-acrylamido-2-methylpropanephosphonic acid. Preferred monomers B are acrylic acid, methacrylic acid, and itaconic acid. For coating compositions of high wet abrasion resistance it has been found suitable for the monomers B to include at least 50% of itaconic acid, based on the overall weight of the monomers B.

In addition to the abovementioned monomers A and B the polymers P employed in accordance with the invention may include up to 20% by weight, based on the overall weight of the polymer P, of monomers C, which are different than the abovementioned monomers A and B.

The monomers C include firstly monomers which likewise polymerize to polymer latices in the free-radical emulsion polymerization. These include, in particular, vinyl esters of aliphatic carboxylic acids, such as vinyl acetate, vinyl propionate and vinyl versatates, and also vinylaromatic compounds such as styrene.

Preferred monomers C are neutral monomers having an increased solubility in water, i.e., >100 g/l (at 25° C.), which are preferably used in amounts of up to 10% by weight, e.g., from 0.1 to 5% by weight. They include in particular the amides of the abovementioned monoethylenically unsaturated $C_3$–$C_8$ monocarboxylic acids, such as acrylamide and methacrylamide, and also their hydroxyalkyl esters, such as hydroxyethyl acrylate, hydroxypropyl acrylate, 4-hydroxybutyl acrylate and the corresponding methacrylates, and, furthermore, water-soluble N-vinyllactams, an example being N-vinylpyrrolidone. Particularly preferred monomers C are acrylamide and methacrylamide.

The monomers C further include those monomers which carry urea groups, such as N-vinylurea and N-allylurea, and derivatives of imidazolidin-2-one, examples being N-vinyl- and N-allylimidazolidin-2-one, N-vinyloxyethylimidazolidin-2-one, N-(2-(meth)acrylamidoethyl)imidazolidin-2-one, N-(2-(meth)acryloxyethyl)imidazolidin-2-one, N-[2-((meth)acryloxyacetamido)ethyl]imidazolidin-2-one, etc. These monomers are used preferably in amounts of up to 10% by weight, in particular from 0.5 to 5% by weight, based on the overall weight of the polymer P. Monomers of this kind improve the wet adhesion of the coatings obtainable from the formulations of the invention; that is, the adhesion of the coating in the damp or swollen state.

The monomers C further include monomers containing siloxane groups, e.g., vinyltrialkoxysilanes, such as vinyltrimethoxysilane, alkylvinyldialkoxysilanes or (meth)acryloxyalkyltrialkoxysilanes, e.g., (meth)acryloxyethyltrimethoxysilane, (meth)acryloxypropyltrimethoxysilane. These monomers can be used in amount of up to 1% by weight, preferably from 0.05 to 0.5% by weight, based on the overall monomer amount.

It has further proven advantageous if the addition-polymer particles in the binder polymer dispersion have a weight-average polymer particle diameter in the range from 50 to 1000 nm (determined by means of an ultracentrifuge or by photon correlation spectroscopy; on particle size determination by means of ultracentrifuge see, e.g., W. Mächtle, Makromolekulare Chemie 185 (1984) 1025–1039; W. Mächtle, Angew. Makromolekulare Chemie 162 (1988) 35–42). In binder dispersions having high solids contents, e.g., >50% by weight, based on the overall weight of the binder dispersion, it is advantageous on viscosity grounds if the weight-average diameter of the polymer particles in the dispersion is $\geq 100$ nm. The average particle diameter will preferably not exceed 600 nm.

The aqueous dispersions of the polymer P are prepared in accordance with the invention by free-radical aqueous emulsion polymerization of the abovementioned monomers A, B and, if desired, c in the presence of at least one free-radical polymerization initiator and, if desired, of a surface-active substance.

Suitable free-radical polymerization initiators are all those capable of triggering a free-radical aqueous emulsion polymerization. They can include both peroxides e.g., alkali metal peroxodisulfates, and azo compounds. As polymerization initiators it is common to use what are known as redox initiators, which are composed of at least one organic reductant and at least one peroxide and/or hydroperoxide, e.g., tert-butyl hydroperoxide, with sulfur compounds, e.g., the sodium salt of hydroxymethanesulfinic acid, sodium sulfite, sodium disulfite, sodium thiosulfate or acetone bisulfite adduct, or hydrogen peroxide with ascorbic acid. Use is also made of combined systems, which include a small amount of a metal compound which is soluble in the polymerization medium and whose metallic component is able to exist in a plurality of valence states, an example being ascorbic acid/iron(II) sulfate/hydrogen peroxide, in which the ascorbic acid is frequently replaced by the sodium salt of hydroxymethanesulfinic acid, acetone bisulfite adduct, sodium sulfite, sodium hydrogen sulfite or sodium bisulfite and the hydrogen peroxide by organic peroxides such as tert-butyl hydroperoxide or alkali metal peroxodisulfates and/or ammonium peroxodisulfate. Likewise preferred initiators are peroxodisulfates, such as sodium peroxodisulfate. The amount of free-radical initiator systems used, based on the overall amount of the monomers to be polymerized, is preferably from 0.1 to 2% by weight.

Surface-active substances suitable for conducting the emulsion polymerization are the emulsifiers and protective colloids which are commonly used for this purpose. The surface-active substances are usually used in amounts of up to 10% by weight, preferably from 0.5 to 5% by weight and, in particular, from 1.0 to 4% by weight, based on the monomers to be polymerized.

Examples of suitable protective colloids are polyvinyl alcohols, starch derivatives and cellulose derivatives, or vinylpyrrolidone copolymers. An exhaustive description of further suitable protective colloids is given in Houben-Weyl, Methoden der organischen Chemie, Volume XIV/1, Makromolekulare Stoffe [macromolecular substances], Georg-Thieme-Verlag, Stuttgart 1961, pp. 411–420.

As surface-active substances it is preferred to use exclusively emulsifiers, whose relative molecular weights, in contradistinction to those of the protective colloids, are usually below 2000. They can be either anionic or nonionic in nature. The anionic emulsifiers include alkali metal salts and ammonium salts of alkyl sulfates (alkyl: $C_8$–$C_{12}$), of sulfuric monoesters with ethoxylated alkanols (EO units: 2 to 50, alkyl:. $C_{12}$ to $C_{18}$) and with ethoxylated alkylphenole (EO units: 3 to 50, alkyl: $C_4$–$C_9$), of alkylsulfonic acids (alkyl: $C_{12}$–$C_{18}$) and of alkylarylsulfonic acids (alkyl: $C_9$ to $C_{18}$), and also compounds of the formula I,

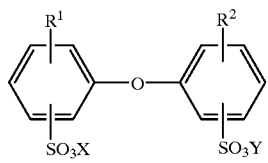

(I)

in which $R^1$ and $R^2$ are hydrogen or $C_4$–$C_{24}$ alkyl, preferably $C_8$–$C_{16}$ alkyl, but are not both hydrogen, and X and Y can be alkali metal ions and/or ammonium ions. It is common to use technical-grade mixtures containing from.50 to 90% by weight of the monoalkylated product, an example being Dowfax® 2A1 ($R^1$=$C_{12}$ alkyl; DOW CHEMICAL). The compounds I are known generally, for example from U.S. Pat. No. 4,269,749, and are obtainable commercially.

Suitable nonionic emulsifiers are araliphatic or aliphatic nonionic emulsifiers, examples being ethoxylated mono-, di- and trialkylphenols (EO units: 3 to 50, alkyl: $C_4$–$C_9$), ethoxylates of long-chain alcohols (EO units: 3 to 50, alkyl: $C_8$–$C_{36}$), and polyethylene oxide/polypropylene oxide block copolymers. Preference is given to ethoxylates of long-chain alkanols (alkyl: $C_{10}$–$C_{22}$, average degree of ethoxylation: 3 to 50) and, of these, particular preference is given to those based on naturally occurring alcohols or oxo alcohols having a linear or branched $C_{12}$–$C_{18}$ alkyl radical and a degree of ethoxylation from 8 to 50. Anionic emulsifiers are preferred. Particular preference is given to combinations of at least one anionic and one nonionic emulsifier or to combinations of two anionic emulsifiers.

Further suitable emulsifiers can be found in Houben-Weyl, Methoden der organischen Chemie, Volume XIV/1, Makromolekulare Stoffe [macromolecular substances], Georg-Thieme-Verlag, Stuttgart, 1961, pp. 192–208.

The molecular weight of the polymers P can be adjusted by adding small amounts, generally up to 2% by weight, based on the monomers to be polymerized, of one or more molecular-weight regulator substances, examples being organic thio compounds, silanes, allyl alcohols, or aldehydes.

Emulsion polymerization can be conducted either continuously or batchwise, preferably by a semicontinuous process. In the case of semicontinuous processes the majority, i.e., at least 70%, preferably at least 90%, of the monomers to be polymerized is supplied to the polymerization batch continuously, including stage or gradient procedures. This procedure is also known as the monomer feed technique. The monomer feed comprisesliquid monomer mixtures, monomer solutions, or, in particular, aqueous monomer emulsions.

In addition to the seed-free mode of preparation it is also possible, in order to establish a defined polymer particle size, to conduct the emulsion polymerization in accordance with the seed latex technique or in the presence of seed latex prepared in situ. Techniques for doing this are known and can be found in the prior art (see EP-B 40419, EP-A-614 922, EP-A-567 812 and literature cited therein, and 'Encyclopedia of Polymer Science and Technology', Vol. 5, John Wiley & Sons Inc., New York 1966, p. 847).

Polymerization is preferably conducted in the presence of from 0.01 to 3% by weight and, in particular, from 0.02 to 1.5% by weight of a seed latex (solids content of the seed latex, based on overall monomer amount), preferably with seed latex introduced in the initial charge (initial-charge seed). The seed latex can also be produced in situ from the monomers to be polymerized, by initially introducing a small amount of the monomers to be polymerized in the form of an aqueous emulsion together with a portion of the surface-active substance, heating this emulsion to polymerization temperature and then adding a portion of the initiator.

The temperature and pressure of polymerization are of minor importance. It is generally conducted at temperatures between room temperature and 120° C., preferably at temperatures from 40 to 95° c. and, with particular preference, between 50 and 90° C.

Following the actual polymerization reaction it may be necessary to free the aqueous polymer dispersions of the invention substantially from odoriferous substances, such as residual monomers and other volatile organic constituents. This can be done in a manner known per se physically, by distillative removal (especially by way of steam distillation), or by stripping with an inert gas. The residual monomers can also be reduced in amount chemically by means of free-radical postpolymerization, especially under the action of redox initiator systems as set out, for example, in DE-A 44 35 423. The postpolymerization is preferably conducted with a redox initiator system comprising at least one organic peroxide and one organic gulf its.

Before being used in the formulations of the invention, the dispersions of the polymer P are preferably adjusted to a pH in the range from 6 to 10, preferably by adding a nonvolatile base, examples of such bases being alkali metal or alkaline earth metal hydroxides, or nonvolatile amines.

By the method of emulsion polymerization it is possible in principle to obtain dispersions having solids contents of up to about 80% by weight (polymer content based on the overall weight of the dispersion). Taking into account practical considerations, polymer dispersions having solids contents in the range from 40 to 70% by weight are generally preferred for the formulations of the invention. Particular preference is given to dispersions having polymer contents of about 50% by weight. Dispersions having lower solids contents are of course also suitable in principle for use for the formulations of the invention.

In accordance with the invention, the polymers P in the form of their aqueous polymer dispersions are used as binders in pigmented formulations that are used to coat substrates (pigmented coating compositions). Such formulations include, for example, polymer dispersion renders, tile adhesives, paints or sealants, especially for porous components.

One preferred embodiment of the present invention relates to formulations in the form of emulsion paints, especially for outdoor applications. The coatings obtainable from these paints are particularly notable for an especially low soiling tendency and outstanding weathering stability.

The coating compositions of the invention, preferably the emulsion paints, contain generally from 30 to 75% by weight and preferably from 40 to 65% by weight of non-volatile constituents. These include all constituents of the formulation other than water, but at least the overall amount of binder, filler, pigment, and polymeric auxiliaries. Of this overall amount, approximately i) from 3 to 90% by weight, preferably from 10 to 60% by weight, are accounted for by solid binder constituents (polymer P);

ii) from 5 to 85% by weight, preferably from 10 to 60% by weight, by at least one inorganic pigment, and from 0 to 85% by weight, preferably from 20 to 70% by weight, by inorganic fillers;

iii) from 0.05 to <0.3, preferably from 0.1 to <0.3, % by weight, based on the polymer P, by at least one non-polymerizable photoinitiator; and iv) from 0.1 to 40% by weight, preferably from 0.5 to 15% by weight, by customary auxiliaries, the pigment volume concentration pvc of the coating compositions being in accordance with the invention at least 10, preferably at least 15 and, in particular, at least 20 and generally not exceeding 75. In coating compositions in the form of emulsion paints for outdoor applications the pvc is preferably within the range from 10 to 65 and, in particular, in the range from 25 to 55. Accordingly, the weight ratio of polymer P to the overall weight of pigments and fillers is preferably at least 2:1, in particular at least 1.4:1 and, in general, up to 1:8. It is preferably in the range from 3:1 to 1:5 and especially in the range from 1.2:1 to 1:3.5.

Typical pigments for the formulations of the invention, especially for emulsion paints, are titanium dioxide, preferably in the rutile form, barium sulfate, zinc oxide, zinc sulfide, basic lead carbonate, antimony trioxide, lithopones (zinc sulfide+barium sulfate). The formulations may also, however, include color pigments, examples being iron oxides, carbon black, graphite, luminescent pigments, zinc yellow, zinc green, ultramarine, manganese black, antimony black, manganese violet, Paris blue or Schweinfurth green.

Suitable fillers include alumosilicates, such as feldspars, silicates, such as kaolin, talc, mica, magnesite, alkaline earth metal carbonates, such as calcium carbonate, in the form for example of calcite or chalk, magnesium carbonate, dolomite, alkaline earth metal sulfates, such as calcium sulfate, silicon dioxide, etc. The fillers can be used as individual components. In practice, however, it has been found particularly appropriate to use mixtures of fillers, e.g., calcium carbonate/kaolin, calcium carbonate/talc.

In order to increase the hiding power and to save on the use of white pigments, it is common in the preferred emulsion paints to use finely divided fillers, an example being finely divided calcium carbonate, or mixtures of different calcium carbonates of different particle sizes. In order to adjust the hiding power, shade and depth of color it is preferred to employ blends of color pigments and fillers.

The customary auxiliaries iv) include wetting agents and dispersants, such as sodium, potassium or ammonium polyphosphates, alkali metal salts and ammonium salts of polyacrylic acids and of polymaleic acid, polyphosphonates, such as sodium 1-hydroxyethane-1,1-diphosphonate, and also salts of naphthalenesulfonic acids, especially the sodium salts thereof. The dispersants are generally used in an amount of from 0.1 to 0.6% by weight, based on the overall weight of the emulsion paint. The auxiliaries iv generally further include defoamers, preservatives, hydrophobicizing agents, biocides, fibers, or other constituents.

Furthermore, the auxiliaries iv) may also include thickeners, examples being cellulose derivatives, such da methylcellulose, hydroxyethylcellulose and carboxymethylcellulose, and also casein, gum arabic, tragacanth gum, starch, sodium alginate, polyvinyl alcohol, polyvinylpyrrolidone, sodium polyacrylates, water-soluble copolymers based on acrylic and methacrylic acid, such as acrylic acid/acrylamide copolymers and methacrylic acid/acrylate copolymers, and what are known as associative thickeners, examples being styrene-maleic anhydride polymers or preferably hydrophobically modified polyether urethanes, as described, for example, by N. Chen et al. in J. Coatings Techn., 69 (1997), No. 867 on page 73 and by R. D. Hester et al., J. Coatings Technology, 69 (1997), No. 864 on page 109 and the disclosure content of which is hereby incorporated fully by reference. Inorganic thickeners as well, such as bentonites or hectorite, can be used. Thickeners are used generally in amounts of from 0.1 to 3% by weight, preferably from 0.1 to 1% by weight, based on the overall weight of the aqueous formulation.

The coating compositions of the invention are stable fluid systems which can be used to coat a large number of substrates. Examples of suitable substrates include wood, concrete, metal, glass, ceramics, plastic, renders, wallpapers, and other painted, primed or weathered substrates. The application of the coating composition to the substrate that is to be coated takes place in a manner dependent on the configuration of the formulation. Depending on the viscosity and pigment content of the formulation and on the substrate, application may take place by rolling, brushing, knife-coating or spraying. The coating compositions of the invention can be used both as topcoat paint for primed substrates and unprimed substrates and as primer compositions, the latter generally having a relatively low solids content.

The coating compositions of the invention are notable for good weathering stability and good wet abrasion resistance. Their soiling tendency, especially in the case of outdoor applications, is a marked improvement on that of conventional coating compositions based on soft binders. An improvement is also evident relative to conventional solventborne coating compositions.

The examples below are intended to illustrate the invention, though without restricting it.

I. Preparation and Characterization of the Polymer Dispersions (Polymers P)

The average particle size (z-average) of the polymer particles was measured by dynamic light scattering (photon correlation spectroscopy) on a 0.01% by weight dispersion in water at 23° C. using an Autosizer IIc from Malvern Instruments, UK. The value reported is the cumulant z-average diameter of the measured autocorrelation function.

The minimum film-forming temperature (MFT) of the polymer dispersions was measured in accordance with Ullmanns Enzyklopädie der technischen Chemie, 4th Edition, Vol. 19, VCH Weinheim 1980, p. 17. The measuring instrument used was a film formation bench (metal plate to which a temperature gradient is applied and on which temperature sensors are mounted at various points for temperature calibration, the temperature gradient being chosen so that one end of the film formation bench has a temperature above the expected MET and the other end has a temperature below the expected MFT). The aqueous polymer dispersion is applied to the film formation bench. In those regions of the film formation bench whose temperature is above the MFT a clear film is formed on drying, whereas in the cooler regions cracks appear in the film and at even lower temperatures a white powder is formed. The MFT is determined visually on the basis of the known temperature profile of the plate.

1. Dispersion D1

A reactor was charged with 300 g of deionized water, 3.56 g of emulsifier solution 1, 1.6 g of itaconic acid, and 64.7 g of monomer emulsion. This initial charge was heated to 85° C. under a nitrogen atmosphere. Then 7.86 g of aqueous initiator solution were added. Thereafter, the remainder of the monomer emulsion was added over the course of 3 hours and the remainder of the initiator solution over the course of 3.5 hours. Following the end of the addition of initiator, the temperature was maintained for 1 hour and then the mixture was cooled to 60° C. Then 1.14 g of tert-butyl hydroperoxide (as a 70% strength by weight aqueous solution) and 0.64 g of the sodium salt of hydroxymethanesulfinic acid (dissolved in 2 g of water) were added to the reactor by way of separate feeds. The 60° C. were maintained for a further 15 minutes. The mixture was then cooled to room temperature and its pH was adjusted to 7.6 using 10% strength by weight sodium hydroxide solution. The resulting dispersion was free from coagulum and had a solids content of 48.9% by weight. The weight-average particle diameter of the polymer was 150 nm. The MFT was 0° C. and the glass transition temperature was 6.9° C. (DSC, midpoint).

Initiator solution:
    3.6 g of sodium peroxodisulfate
    75.00 g of deionized water Monomer emulsion:
    405.65 g of deionized water
    14.22 g of emulsifier solution 1
    42.67 g of emulsifier solution 2
    320.00 g of methyl methacrylate
    480.00 g of n-butyl acrylate
    8.00 g of acrylic acid
    24.00 g of a 50% strength by weight aqueous acrylamide solution Emulsifier solution 1: 45% strength by weight solution of (dodecylsulfonylphenoxy)benzene-sulfonic acid sodium salt (Dowfax® 2A1 from Dow Chemicals) in water Emulsifier solution 2: 15% strength by weight aqueous sodium dodecyl sulfate solution 2. Dispersion D2

Dispersion D2 was prepared from 200 parts by weight of dispersion D1 (polymer content about 50% by weight) by adding 0.25 part by weight of a mixture of benzophenone and 1-benzoyl-1-hydroxycyclohexane in a weight ratio of 1:1 (0.25% by weight photoinitiator blend, based on dry polymer P).

3. Dispersion D3

A dispersion D3 was prepared in the manner described for D1 with an altered monomer composition. The initial charge contained 350 g of deionized water, 3.3 g of emulsifier solution 1 and 18.75 g of emulsifier solution 3. The polymerization was initiated by adding 10.19 g of initiator solution at 85° C. The monomers were added over the course of 2.5 hours, the remaining initiator solution over the course of 3 hours. Chemical deodorization was carried out using 1.07 g of tert-butyl hydroperoxide and 0.6 g of the sodium salt of hydroxymethanesulfinic acid. Following the polymerization reaction the pH was adjusted to 7.9 using 10% strength by weight sodium hydroxide solution. The resultant dispersion was free from coagulum and had a solids content of 50% by weight. The average diameter of the polymer particles was 151 nm. The MFT was below 0° C., the glass transition temperature was −2° C.

Initiator solution:
    1.88 g of sodium peroxodisulfate
    100.00 g of deionized water Monomer emulsion:
    271.55 g of water
    11.67 g of emulsifier solution 1
    35.00 g of emulsifier solution 2
    247.50 g of methyl methacrylate
    502.50 g of n-butyl acrylate
    3.75 g of acrylic acid
    3.75 g of methacrylic acid
    22.50 g of 50% strength by weight aqueous acrylamide solution Emulsifier solution 3: 20% strength by weight aqueous solution of an ethoxylated $C_{16}$–$C_{18}$ alkanol (18 EO units)

4. Dispersion D4

Dispersion D4 was prepared from 200 parts by weight of dispersion D3 (polymer content about 50% by weight) by adding 0.25 part by weight of a mixture of benzophenone and 1-benzoyl-1-hydroxycyclohexane in a weight ratio of 1:1 (0.25% by weight of photoinitiator blend, based on dry polymer P).

5. Dispersion D5

D5 is a commercially available aqueous polymer dispersion based on n-butyl acrylate and methyl methacrylate having a solids content of about 50% by weight, and a minimum film-forming temperature of about 13° C. The weight-average size of the polymer particles in the dispersion is approximately 100 nm.

II. Preparation of the Coating Compositions (Example B1 and B2, Comparative Example VB1)

To prepare the coating compositions B1 and B2, the dispersions D2 and D4 were blended with the following constituents in the sequence stated.

First of all,
    89 g of deionized water
    2 g of dispersant[1])
    3 g of preservative[2]),
    4 g of aqueous sodium polyphosphate solution (25% strength by weight)
    60 g of aqueous thickener solution A (2% strength by weight)[3])
    2 g of defoamer[4])
    2 g of caustic soda (20% by weight)
    157 g of titanium dioxide[5])
    182 g of calcium carbonate[6])
    56 g of talc (5 μm)

were combined in succession with stirring and mixed for 20 minutes. The following were then added with stirring:
    1 g of defoamer[4])
    382 g of aqueous polymer dispersion (approximately 50% by weight)
    50 g of aqueous thickener solution B (5% strength by weight)[7]) and
    10 g of water 1) Pigmentverteiler S: 30% strength by weight of ammonium polyacrylate solution (BASF Aktiengesellschaft)
2) Parmetol A26 from Schultze and Mayr Gnash, Norderstedt, DE 3) Aqueous hydroxyethylcellulose solution; Natrosol® 250HR; Hercules GmbH, Düsseldorf, DE
4) Agitan® 280; Münzing-Chemie GmbH, Heilbronn, DE
5) Titanium pigment rutile type; Kronos 2190 from Kronos Titan GmbH, Leverkusen, DE
6) Omyacarb 5 GU; Omya GmbH, Cologne, DE
7) Acrysol® TT-935; Rohm & Haas Deutschland GmbH, Frankfurt, DE.

For comparison purposes a solventborne paint VB1 was formulated oh the basis of the dispersion D5. It contained the constituents indicated for HI in the amounts specified there. In addition the paint, based on dry polymer, contained 24% by weight of white spirit (boiling range from 180 to 210° C.) and 26% by weight of plasticizer (LUSOLVAN® FBH from BASF AG).

III. Performance Testing a) Preparation of the Coatings

A mixture of water and coating composition in a volume ratio of 1:1 was first applied as a primer to fiber cement slabs using a brush. The respective paint was then applied undiluted (approximately 300 g/m² dry coating). The coating was dried initially for 7 days.

b)

The samples obtained in accordance with a) were exposed for about 3 years to central European weather (experimental station at Ludwigshafen, Germany). For this purpose the fiber cement slabs were set up at an inclination of 45° C. with the coated face pointing south. After weathering, the slabs were examined visually and by colorimetry (colorimetric measurement in accordance with DIN 6174). Colorimetric examination was carried out both on an uncleaned slab and on a slab which had been washed down beforehand using a wet sponge.

For the visual examination, the samples were awarded scores from 0 to 5, 0 representing no visible soiling and 5 severe soiling (gray surface). The results are collated in Table 1.

TABLE 1

Soil pickup of coatings based on the coating compositions B1, B2 and VB1

| | | | Soil pickup | |
| | | | colorimetric[1)] | |
| Example | Dispersion | Visual | uncleaned | washed |
| B1 | D2 | 3 | 8.22 | 5.71 |
| B2 | D4 | 4 | 8.69 | 6.74 |
| VB1 | D5 | 4 | 11.99 | 7.01 |

[1)] Δ E Cielab (DIN 6174)

We claim:

1. An aqueous pigmented coating composition in the form of an emulsion paint having a pigment volume concentration (pvc)of at least 10 which contains less than 0.1% by weight of volatile organic compounds and comprises:
   (i) at least one aqueous room temperature film forming polymer dispersion of at least one polymer P having a glass transition temperature $T_g$ ranging from −10° C. to +25° C., which comprises:
      from 80 to 99.95% by weight of at least one monomer A selected from the group consisting of esters of acrylic acid with $C_2$–$C_{20}$ alkanols or $C_5$–$C_{10}$ cycloalkanols and the esters of methacrylic acid with $C_1$–$C_{20}$ alkanols or $C_5$–$C_{10}$ cycloalkanols,
      from 0.05 to 10% by weight of at least one monomer B selected from the group consisting of ethylenically unsaturated carboxylic acids, ethylenically unsaturated sulfonic acids, ethylenically unsaturated phosphonic acids and their salts, and
      from 0 to 20% by weight of one or more monomers C which are different than the monomers A and B,
   (ii) titanium dioxide pigment, and, if desired, organic or inorganic fillers,
   (iii) from 0.05 to <0.3% by weight, based on the polymer P, of at least one nonpolymerizable photoinitiator,
   (iv) water, and customary auxiliaries.

2. The coating composition as claimed in claim 1, wherein said photoinitiator is selected from the group consisting of benzophenone and derivatives thereof.

3. The coating composition as claimed in claim 1, wherein the aqueous dispersion of the polymer P has a minimum film-forming temperature (MFT) below 10° C.

4. The coating composition as claimed in claim 1, wherein the monomers A comprise, based on their overall weight,
   from 25 to 55% by weight of at least one ester of methacrylic acid with a $C_1$–$C_4$ alkanol, and
   from 45 to 75% by weight of at least one ester of acrylic acid with a $C_2$–$C_{10}$ alkanol.

5. The coating composition as claimed in claim 1, wherein the monomers C are selected from the group consisting of the amides of monoethylenically unsaturated carboxylic acids.

6. The coating composition as claimed in claim 1, wherein the weight ratio of polymer P to the total amount of pigment and fillers is within the range from 2:1 to 1:8.

7. A method of coating substrates, which comprises applying a coating composition as claimed in claim 1, to the substrate which is to be coated and drying said coating composition thereon.

8. The aqueous pigmented coating composition as claimed in claim 1, which comprises 30 to 75% by weight of nonvolatile constituents, which comprise, based on the overall amount of nonvolatile constituents,
   i. from 10 to 60% by weight of polymer P
   ii.
      from 10 to 60% by weight of titanium dioxide, and
      from 20 to 70% by weight of inorganic fillers,
   iii. from 0.05 to <0.3% by weight, based on the polymer P, of at least one nonpolymerizable photoinitiator,
   iv. 0.1 to 40% by weight of customary auxiliaries.

* * * * *